(12) United States Patent
Perkins et al.

(10) Patent No.: US 9,729,946 B2
(45) Date of Patent: Aug. 8, 2017

(54) HIGH-CAPACITY SWITCH

(75) Inventors: Drew D. Perkins, Saratoga, CA (US); Ting-Kuang Chiang, Saratoga, CA (US); Curtis Villamizar, South Orleans, MA (US)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 12/418,283

(22) Filed: Apr. 3, 2009

(65) Prior Publication Data

US 2010/0254705 A1    Oct. 7, 2010

(51) Int. Cl.
*H04J 14/00* (2006.01)
*H04Q 11/00* (2006.01)
*H04J 14/02* (2006.01)

(52) U.S. Cl.
CPC ...... *H04Q 11/0005* (2013.01); *H04J 14/0204* (2013.01); *H04J 14/0205* (2013.01);
(Continued)

(58) Field of Classification Search
USPC ........ 398/45–57; 385/14–16; 370/389, 395.4
See application file for complete search history.

(56) References Cited

U.S. PATENT DOCUMENTS 5,005,166 A * 4/1991 Suzuki et al. .................. 398/47
5,341,234 A * 8/1994 Suzuki et al. .................. 398/51
(Continued)

OTHER PUBLICATIONS

O. Ishida et al., "Parallel-optical-interconnecting multiwavelength star network (POIMS Net) for high-capacity switching", Electronics Letters, Sep. 12, 1996, vol. 32 No. 19, pp. 1804-1806.
(Continued)

*Primary Examiner* — Li Liu
(74) *Attorney, Agent, or Firm* — David L. Soltz

(57) ABSTRACT

Consistent with the present disclosure, an optical switch is provided that switches multiple wavelength division multiplexed (WDM) optical signals. Each of the WDM signals includes optical signals having the same wavelengths. The WDM signals are supplied to optical splitters, which supply power split portions of the WDM signals to corresponding optical gates. Groups of the optical gates are associated with a corresponding switching block, which may include a cyclical arrayed waveguide grating (AWG), and the optical gates within each group are controlled so that one gate passes a received WDM signal portion while the remaining optical gates in the group are in a blocking configuration. As a result, the WDM portion received by the non-blocking gate is demultiplexed in the switching block and each of the wavelength components that constitute the selected WDM portion are supplied to corresponding outputs within the switching block. In a later time interval, a different optical gate may be rendered non-blocking so that a different WDM signal portion, supplied from a different optical splitter and carrying different information over the same wavelengths, may be input to the switching block. Thus, by controlling the optical gates, different WDM signal portions may be switched to, and thus demultiplexed by, a particular switching block. In addition, portions of the same WDM signal may be selectively supplied to different AWGs by appropriately control of the optical gates.

6 Claims, 13 Drawing Sheets

(52) U.S. Cl.
CPC ....... *H04J 14/0212* (2013.01); *H04J 14/0221* (2013.01); *H04Q 2011/0013* (2013.01); *H04Q 2011/0015* (2013.01); *H04Q 2011/0016* (2013.01); *H04Q 2011/0032* (2013.01)

(56) References Cited

U.S. PATENT DOCUMENTS

| | | | |
|---|---|---|---|
| 5,475,679 A * | 12/1995 | Munter | 370/395.4 |
| 5,701,371 A | 12/1997 | Ishida | |
| 5,937,117 A | 8/1999 | Ishida et al. | |
| 6,243,178 B1 * | 6/2001 | Suemura et al. | 398/56 |
| 6,333,800 B1 * | 12/2001 | Suemura et al. | 398/9 |
| 6,426,831 B1 * | 7/2002 | Schmidt et al. | 359/326 |
| 6,445,473 B1 * | 9/2002 | Suemura et al. | 398/48 |
| 6,721,315 B1 * | 4/2004 | Xiong et al. | 370/389 |
| 6,771,905 B1 * | 8/2004 | Bortz | 398/45 |
| 6,934,471 B1 * | 8/2005 | Carvey et al. | 398/45 |
| 7,042,883 B2 * | 5/2006 | Fan et al. | 370/395.4 |
| 7,116,851 B2 * | 10/2006 | Welch et al. | 385/14 |
| 2002/0041727 A1 * | 4/2002 | Zami et al. | 385/16 |
| 2009/0003827 A1 * | 1/2009 | Kai et al. | 398/45 |

OTHER PUBLICATIONS

O. Ishida et al., "Multichannel Frequency-Selective Switch Employing an Arrayed-Waveguide Grating Multiplexer with Fold-Back Optical Paths," IEEE Photonics Technology Letters, vol. 6, No. 10. Oct. 1994, pp. 1219-1221.

O. Ishida et al., "Parallel-Optical-Interconnecting Multiwavelength Star Network (POIMS Net) for the ultimate in high-capacity switching", Advanced Applications of Lasers in Materials Processing/ Broadband Optical Networks/Smart Pixels/Optical MEMs and Their Applications, IEEE/LEOS 1996 Summer Topical Meetincs,Aug. 1996, WB3.

* cited by examiner

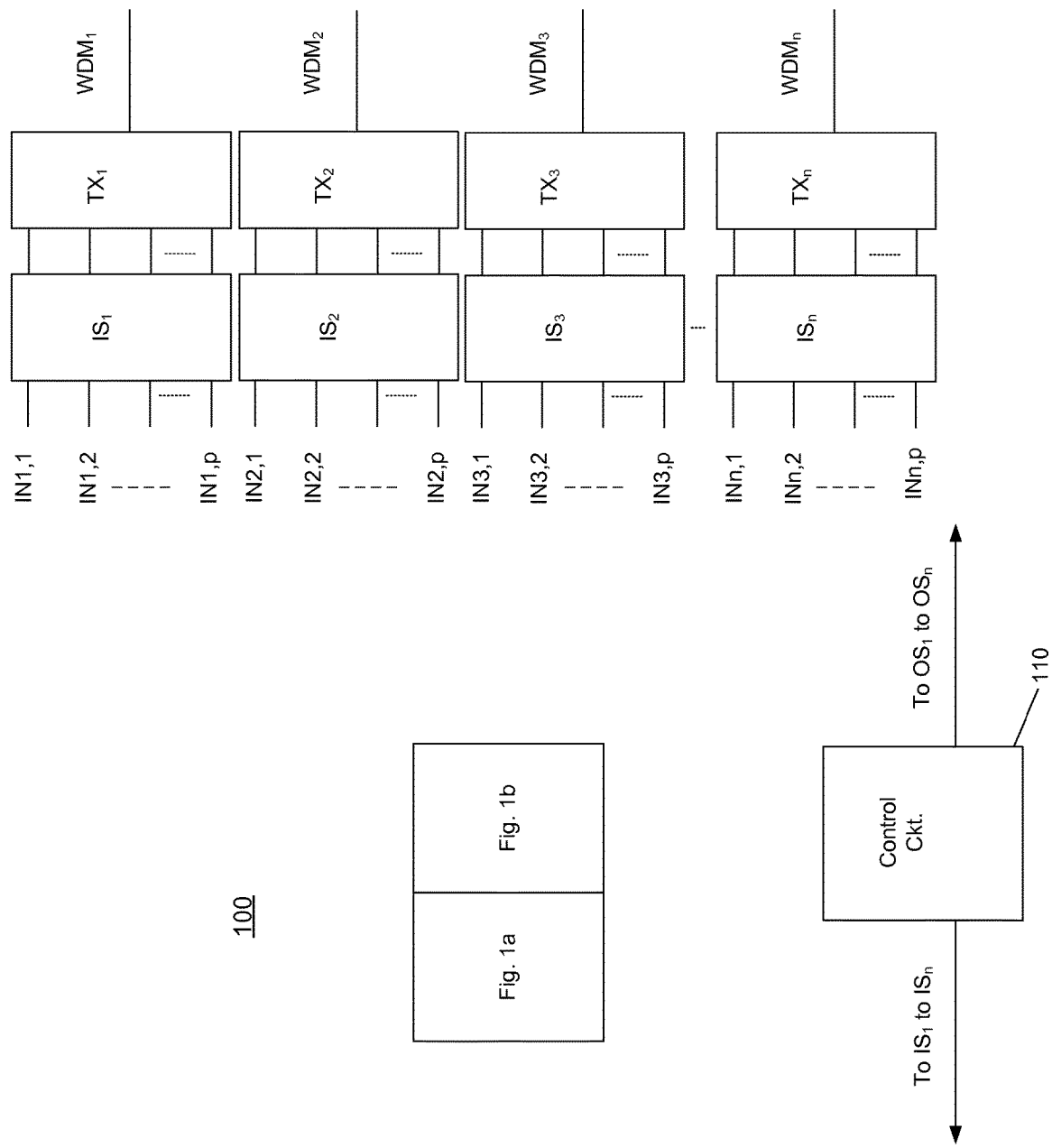

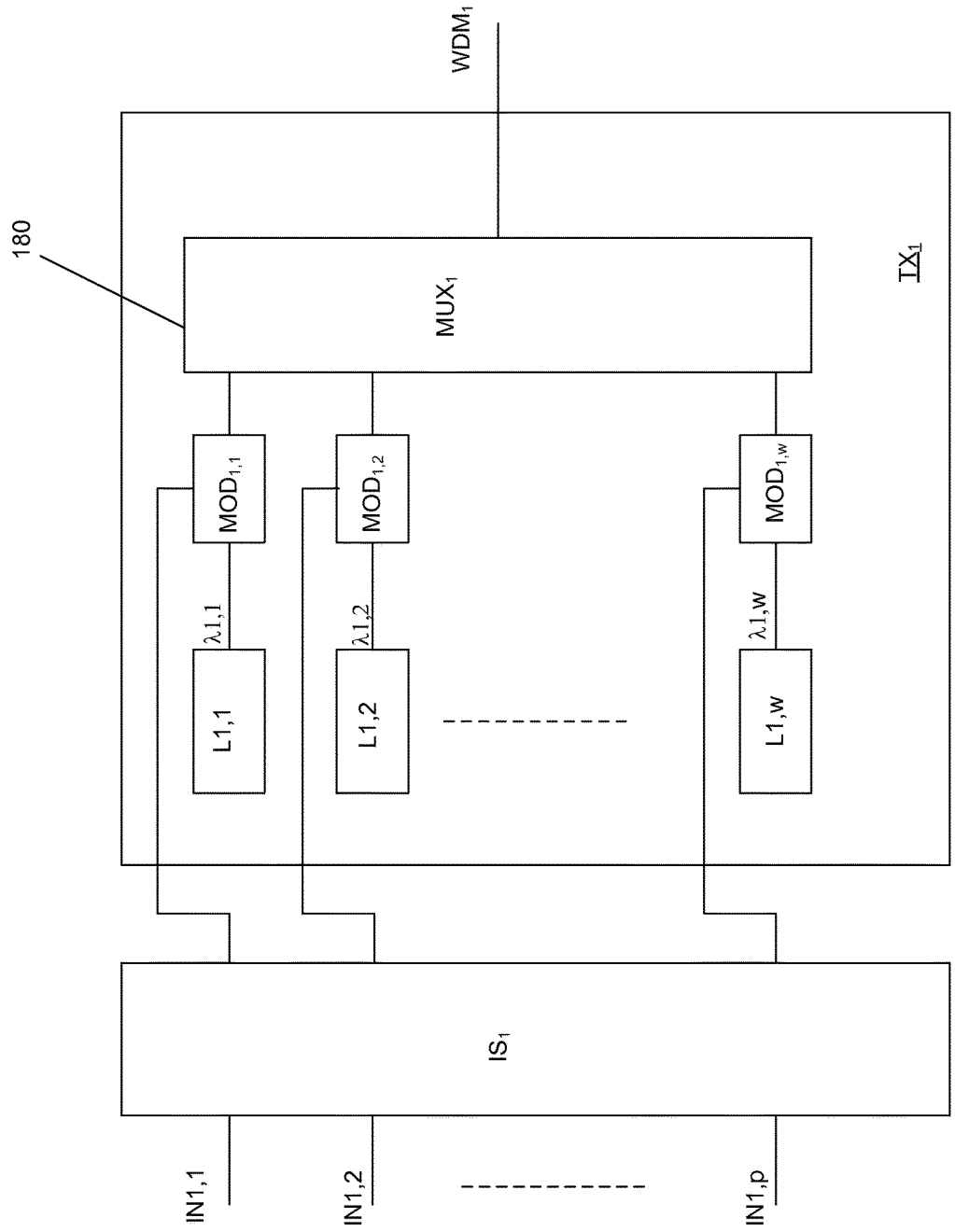

HIGH-CAPACITY SWITCH

BACKGROUND

In a high-capacity network switch, signals may be switched from one communication path to another. In order to achieve such switching, the signals are usually received at one of a plurality of inputs and converted to electrical signals. The electrical signals are then electronically switched to one or more of a plurality of outputs where they are used to generate further signals, which are each transmitted over a respective communication path.

An alternative approach involves optical switching, whereby electrical signals are received at one of a plurality of inputs and converted to optical signals. The optical signals are then optically switched to one or more of a plurality of outputs without optical-to-electrical conversion where they are used to generate further signals, which are each transmitted over a respective communication path. Such switching typically includes multiple discrete optical components, which can be expensive and bulky. Accordingly, there is a need for a high-capacity low-cost optical switch having a compact design.

SUMMARY

In accordance with the present disclosure, an optical switch is provided which includes a first input scheduler having a first plurality of electrical input signals and a first plurality of electrical output signals. The first plurality of electrical output signals of the first input scheduler are supplied to a first wavelength division multiplexed (WDM) transmitter which generates a first WDM signal including a first plurality of optical signals corresponding to the first plurality of output signals of the first input scheduler. Each of the first plurality of optical signals has a corresponding one of a plurality of wavelengths. The first WDM transmitter is coupled to an input of a first optical splitter having a plurality of outputs. One of the plurality of outputs of the first optical splitter supplies a first WDM signal portion, which includes a portion of each of the first plurality of optical signals. The switch also includes a second input scheduler having a second plurality of electrical input signals, a second WDM transmitter, and a second optical splitter having a plurality of outputs. The input of the second optical splitter is configured to receive a second WDM signal including a second plurality of optical signals, each of which having a corresponding one of the plurality of wavelengths. One of the outputs of the second optical splitter supplies a second WDM signal portion, which includes a portion of each of the second plurality of optical signals. Each of the plurality of second optical signal portions has a corresponding one of the plurality of wavelengths. In addition, the switch includes first and second optical gates, and a switching block, including, in one example, an arrayed waveguide grating (AWG). The switching block includes a first input, a second input, and a plurality of outputs. The first optical gate is configured to selectively pass the first WDM signal portion to the first input of the AWG, and the second optical gate is configured to selectively pass the second WDM signal portion to the second input of the switching block. Each of the plurality of outputs of the switching block supplies a corresponding one of the plurality of first optical signal portions when the first optical gate passes the first WDM signal portion, and each of the plurality of outputs of the AWG supplies a corresponding one of the plurality of second optical signal portions when the second optical gate passes the second WDM signal portion.

Consistent with a further aspect of the present disclosure, a switch is provided that comprises a plurality of arrayed waveguide gratings (AWGs) and a plurality of optical gates. Each of a plurality of subgroups of the plurality of optical gates is coupled to a corresponding one of the plurality of AWGs. A first one of the plurality of optical gates is coupled to a first input of one of the plurality of AWGs, and a second one of the plurality of optical gates is coupled to a second input of that AWG. The first one of the plurality of optical gates is configured to selectively pass a first WDM signal to the first input of said one of the plurality of AWGs, and the second one of the plurality of optical gates is configured to selectively pass a second WDM signal to the second input of that AWG. The first WDM signal includes a first plurality of optical signals, each of which having a corresponding one of a plurality of wavelengths, and the second WDM signal includes a second plurality of optical signals, each of which having a corresponding one of the plurality of wavelengths. Further, when the first one of the plurality of optical gates passes the first WDM signal, each of a plurality of outputs of said one of the plurality of AWGs supplies a corresponding one of the first plurality of optical signals. In addition, when the second one of the plurality of optical gates passes the second WDM signal, each of the plurality of outputs of said one of the plurality of AWGs supplies a corresponding one of the second plurality of optical signals.

Further, consistent with the present disclosure, an optical switch is provided that comprises a plurality of optical splitters supplying a plurality of wavelength division multiplexed (WDM) optical signals, and a plurality of optical gates. The optical switch also includes a plurality of arrayed waveguide gratings (AWGs) having a plurality of inputs and a plurality of outputs, such that a subset of the plurality of optical gates passes selected ones of the plurality of WDM optical signals to the plurality of AWGs. In addition, the plurality of AWGs demultiplex the passed selected ones of the WDM optical signals into a plurality of optical signals.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure.

BRIEF DESCRIPTION OF THE DRAWINGS

FIGS. 1a and 1b are block diagrams of an optical switch consistent with the present disclosure;

FIG. 1c is a block diagram of a transmitter consistent with the present disclosure;

DESCRIPTION OF THE EMBODIMENTS

Consistent with the present disclosure, an optical switch is provided that receives data on a plurality of input ports. The data is scheduled for transmission through the switch by input scheduler circuitry and then supplied to transmitters that generate wavelength division multiplexed (WDM) optical signals. Preferably, each of the WDM signals includes optical signals having the same wavelengths. The WDM signals are supplied to optical splitters, which output power split portions of the WDM signals to corresponding optical gates. Groups of the optical gates are associated with a corresponding switching block, which may include a cyclical arrayed waveguide grating (AWG) or another known demultiplexer, and the optical gates within each group are controlled so that one gate passes a received WDM signal portion while the remaining optical gates in the group are in a blocking configuration. As a result, the WDM portion received by the non-blocking gate is demultiplexed in the switching block and each of the wavelength components that constitute the selected WDM portion are supplied to corresponding outputs within the switching block. In a later time interval, a different optical gate may be rendered non-blocking so that a different WDM signal portion, supplied from a different optical splitter and carrying different information over the same wavelengths, may be input to the switching block. Thus, by controlling the optical gates, different WDM signal portions may be switched to, and thus demultiplexed by, a particular switching block. Also, portions of each WDM signal may be selectively supplied to different AWGs by appropriate control of the optical gates.

In addition, the optical gates may include optical components such as semiconductor optical amplifiers, electroabsorption modulators, variable optical attenuators or Mach-Zehnder interferometers and thus may switch at relatively high speeds. These optical components may be integrated along with an associated AWG or other demultiplexer and corresponding photodiodes (to receive the demultiplexed signals) on a common substrate, thereby reducing costs and achieving a compact design.

Reference will now be made in detail to exemplary embodiments of the disclosure, examples of which are illustrated in the accompanying drawings. Wherever possible, the same reference numbers will be used throughout the drawings to refer to the same or like parts.

Figure 1B:
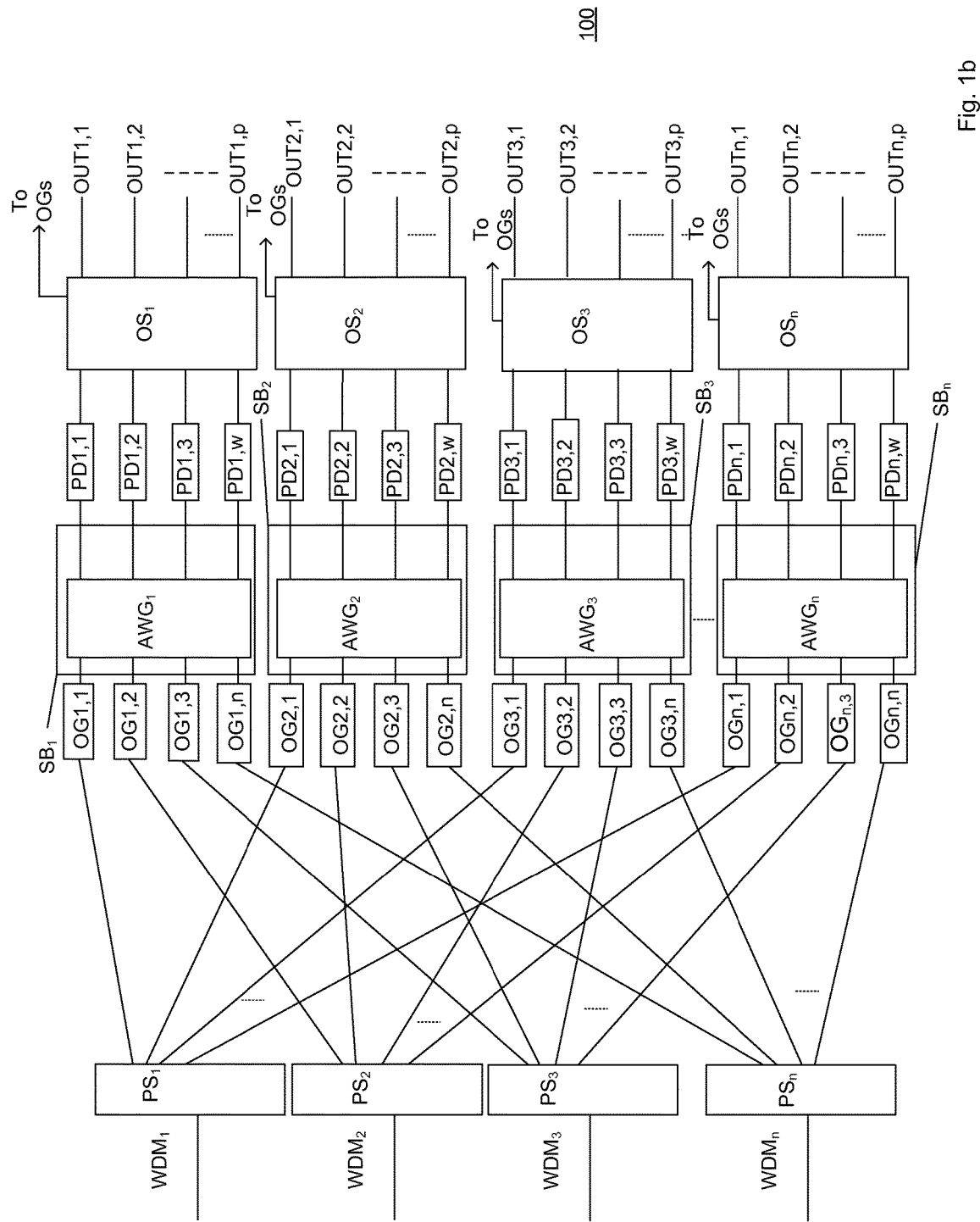

FIGS. 1a and 1b illustrate an example of an optical switch 100 consistent with the present disclosure. Optical switch 100 receives input signals or data $IN_{1,1}$ to $IN_{1,p}$; $IN_{2,1}$ to $IN_{2,p}$; $IN_{3,1}$ to $IN_{3,p}$ ... $IN_{n,1}$ to $IN_{n,p}$ (collectively referred to as input signals IN). Typically, these input signals may be applied to input scheduler circuits or application specific integrated circuits (ASICs) IS1 to ISn, which control the transmission of the data carried by input signals IN. Once scheduled, the data is supplied to transmitters TX1 to TXn, which generate corresponding WDM signals WDM1 to WDMn. Input signal IN may also constitute a stream of packets or a signal that is time division multiplexed, for example.

Input schedulers IS1 to ISn may each include known crossbar scheduler circuitry and data queues for routing data through switch 100. In one example, input schedulers implement a Virtual Output Queue (VOQ) input queuing strategy in which each input port maintains a separate queue for each output port.

An exemplary transmitter, TX1, is shown in greater detail in FIG. 1c. Transmitter TX1 receives data-carrying inputs from input scheduler IS1 and includes a plurality of lasers, $L_{1,1}$ to $L_{1,w}$, which supply light at a corresponding one of wavelengths $\lambda_{1,1}$ to $\lambda_{1,w}$. These inputs, in turn, are used to drive external modulators $MOD_{1,1}$ to $MOD_{1,w}$, each of which modulates a corresponding one of the wavelengths $\lambda_{1,1}$ to $\lambda_{1,w}$ in accordance with the data. Alternatively, the inputs may be used to directly modulate lasers $L_{1,1}$ to $_{1,w}$. In that case, external modulators $MOD_{1,1}$ to $MOD_{1,w}$ may be omitted. The modulated signals are then combined with multiplexer 180 and output as wavelength division multiplexed signal $WDM_1$.

In FIG. 1c, lasers, $L_{1,1}$ to $L_{1,w}$ may be distributed feedback (DFB) lasers, for example, and modulators $MOD_{1,1}$ to $MOD_{1,w}$ may each include an electro-absorption modulator (EAM) or a Mach-Zehnder modulator. Further, multiplexer 180 may be a power combiner or arrayed waveguide grating (AWG), for example. In addition, each of remaining transmitters TX2 to TXn may have a structure similar to that of TX1. In FIG. 1a, n, p, and w are integers that may, or may not, be equal to one another.

Returning to FIG. 1b, optical switch 100 further includes a plurality of optical splitters PS1 to PSn, each of which receiving a corresponding WDM signal WDM1 (including optical channels or signals having different wavelengths) to WDMn. Typically, each WDM signal includes the same set of wavelengths. Each WDM signal WDM1 to WDMn is output form a corresponding one of transmitters TX1 to TXn, where n is any appropriate integer, and may be equal to 16, 40 or 80, for example.

Each of splitters PS1 to PSn has a plurality of outputs, each of which being connected to corresponding ones of optical gates OG in switching blocks SB1 to SBn. Optical gates OG may be arranged in groups associated with switching blocks SB1 to SBn, which, in the example, shown in FIG. 1b, may include arrayed waveguide gratings AWG1 to AWGn. As discussed in greater detail below, however, other demultiplexers may be included in switch blocks SB. As further shown in FIG. 1a, the optical gate group including optical gates $OG_{1,1}$ to $OG_{1,n}$ is associated with and supplies outputs to AWG1. Likewise, optical gate grouping $OG_{2,1}$ to $OG_{2,n}$ is associated with and supplies outputs to AWG2, while optical gate grouping $OG_{3,1}$ to $OG_{3,n}$ is associated with and supplies outputs to AWG3. Such groupings are assigned to each of the n AWGs, such that $OG_{n,1}$ to $OG_{n,n}$ is associated with and supplies outputs to AWGn. It is noted that, in FIGS. 1b, various features, such as optical gates (OG) and photodiodes (PD), are identified with the designation "x,y" where x is an integer and corresponds to a particular AWG or switch block SB in optical switch 100, and y is an integer that designates a particular input or output of such AWG or, with reference to the wavelengths discussed above, "y" may also designate a particular wavelength value.

Each optical splitter (PS) output is typically supplied to one optical gate OG in each AWG optical gate grouping. For example, optical splitter PS1 has n outputs, each of which being coupled to a respective one of gates $OG_{1,1}$ (associated with AWG1, and input 1 of AWG1); $OG_{2,1}$ (associated with AWG2, and input 1 of AWG2); $OG_{3,1}$ (associated with AWG3, and input 1 of AWG3); to $OG_{n,1}$ (associated with AWGn, and input 1 of AWG1). Each of optical gates OG receives a control signal from one of output scheduler circuits $OS_1$ to $OS_n$ and/or input scheduler circuits IS1 to ISn, which are typically under control of control circuit 110. In response to the control signals, optical gates OG may be rendered in a blocking or non-blocking state to selectively pass the optical signals applied thereto. For example, control signals supplied to optical gates $OG_{3,1}$ to $OG_{3,n}$ may render optical gate $OG_{3,2}$, for example, non-blocking to pass light supplied from splitter SP2 to AWG3, while remaining optical gates $OG_{3,1}$, $OG_{3,3}$ to $OG_{3,n}$ are rendered in a blocking state and do not forward light to AWG3. It is noted that although control circuitry (circuit 110) is shown as being centralized in FIG. 1*a*, it is understood that the control circuitry may be distributed in each of IS1 to ISn and OS1 to OSn.

Each of AWG1 to AWGn may be configured as a demultiplexer to separate or demultiplex optical signals supplied thereto. AWG1 will next be described with reference to FIG. 2. It is understood that remaining arrayed waveguide gratings AWG2 to AWGn have a similar structure as AWG1.

Figure 2:
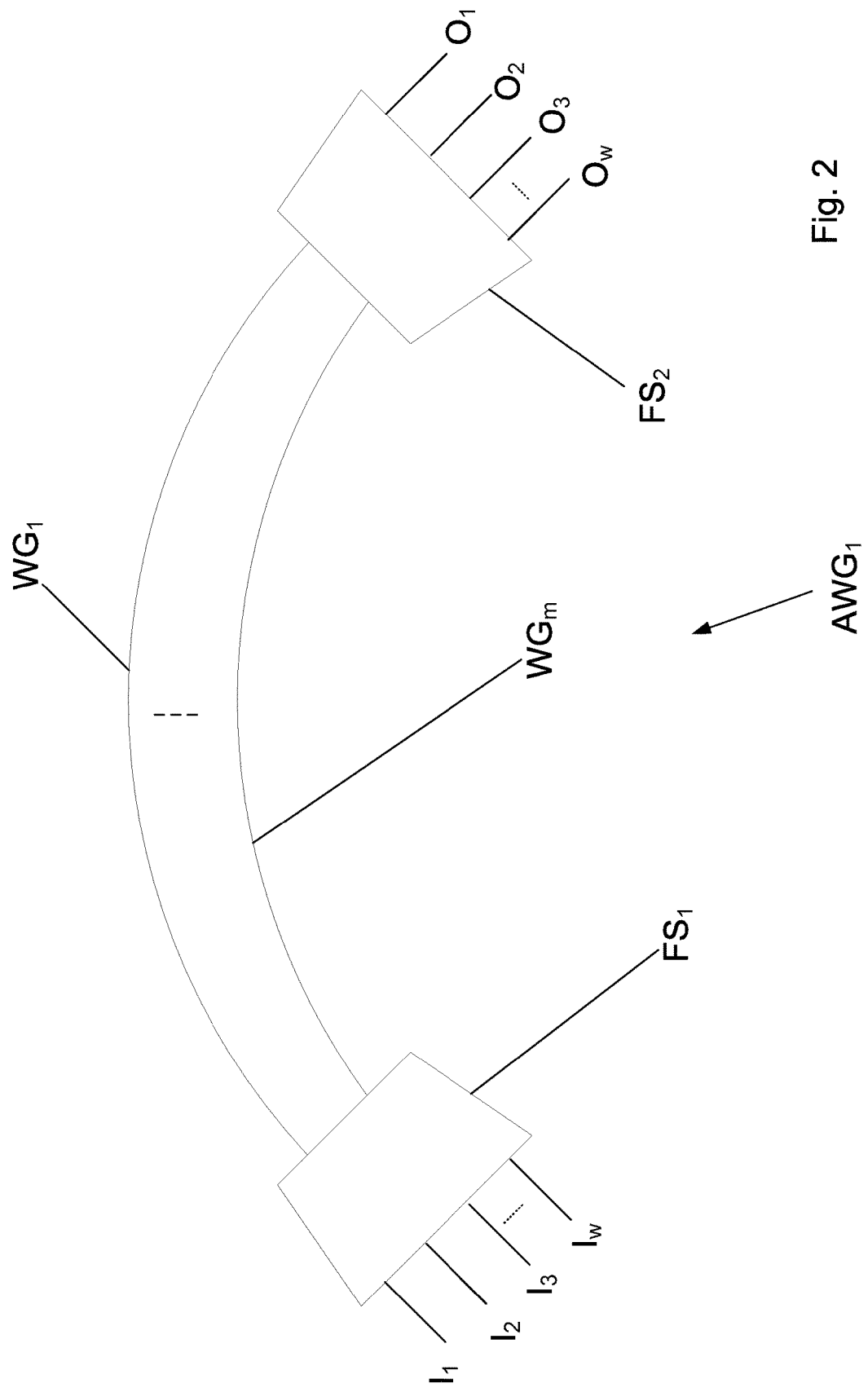
FIG. 2 is a diagram of an arrayed waveguide grating (AWG) consistent with an aspect of the present disclosure.

As shown in FIG. 2, AWG1 includes a plurality of inputs, such as input waveguides I1 to Iw connected to a dielectric slab or free space region FS1. Free space region FS1 is connected to free space region FS2 by a plurality of waveguides WG1 to WGm, each of which having a length that differs from an adjacent waveguide by an incremental amount. A plurality of outputs, such as waveguides O1 to Ow, is coupled to free space region FS2.

As generally understood, wavelength division multiplexed (WDM) optical signal (WDM1), including optical signals having wavelengths $\lambda_1$ to $\lambda_w$, for example, may be supplied to one of inputs I1 to Iw. Each optical signal propagates through free space region FS1 and illuminates end portions of waveguides WG1 to WGm. Each optical signal next travels through waveguides WG1 to WGm and undergoes a constant change of phase attributable to the length increment of the waveguides. In free space region FS2, light output from waveguides WG1 to WGm is diffracted and interferes constructively. As a result, if the WDM signal is supplied to input I1, optical signals having wavelengths $\lambda_1$ to $\lambda_w$ may be re-focused onto a corresponding one of output waveguides O1 to Ow, such that $\lambda_1$ is output on waveguide O1, $\lambda_2$ is output on waveguide O2, $\lambda_3$ is output on waveguide O3, and so on such that $\lambda_w$ is output on waveguide On.

As further understood, if, for example, another WDM signal, also including optical signals having wavelengths $\lambda_1$ to $\lambda_w$ is supplied to input I2, instead of I1, AWG1 will still demultiplex the signal, but the optical signal will be supplied to different outputs. In particular, in this example, wavelength $\lambda_1$ may be supplied from output O2, wavelength $\lambda_2$ may be supplied from O3, and so on such that wavelength $\lambda_{(w-1)}$ may be supplied from output Ow. In addition, wavelength $\lambda w$ may be supplied from output O1. Thus, the waveguide from which a particular optical signal is output depends on both the wavelength of the optical signal, as well as the position of the input waveguide that feeds the optical signal to the AWG.

Returning to FIG. 1*b*, each output of AWG1 to AWGn is fed to a corresponding one of photodiodes PD, which convert the received optical signals to corresponding electrical signals. The photodiodes PD are, like the optical gates OG, arranged in groupings associated with arrayed waveguide gratings AWG1 to AWGn. For example, each of photodiodes $PD_{1,1}$ to $PD_{1,w}$ in a first grouping receives a corresponding one of outputs from AWG1. Likewise, photodiodes $PD_{2,1}$ to $PD_{2,w}$ in a second grouping are associated with outputs from AWG2, while another grouping including photodiodes ping $PD_{3,1}$ to $PD_{3,w}$ is associated with and receives outputs from AWG3. Such groupings are assigned each of the n AWGs, such that photodiodes $PD_{n,1}$ to $PD_{n,w}$ are associated with and receive outputs from AWGn.

Electronic switching circuitry may also be included in optical switch 100, such as output scheduler circuits $OS_1$ to $OS_n$ (FIG. 1*b*) to shuffle, inverse multiplex, lane switch, or otherwise further process the outputs of the photodiodes PD to thereby generate output electrical signals OUT, which may also be output in associated groupings (e.g., electrical signals $OUT_{1,1}$ to $OUT_{1,n}$ in a first grouping correspond to the outputs of AWG1). Similarly, electrical signals $OUT_{2,1}$ to $OUT_{2,n}$ in a second grouping are associated with outputs from AWG2, while another grouping of electrical signals, $OUT_{3,1}$ to $OUT_{3,n}$ is associated with and receives outputs from AWG3. In a similar fashion, as that noted above in regard to the arrangement of the optical gates OG and photodiodes PD, the electrical signal groupings are typically assigned to each of the n AWGs, such that electrical signals $OUT_{n,1}$ to $OUT_{n,n}$ are associated with and receive outputs from AWGn.

Each optical gate grouping and associated AWG, photodiode grouping, and output scheduler circuit may be housed separately from one another on a printed circuit board or card, for example. In that case, each card would output a corresponding one of the electrical signal groupings discussed above.

Control circuit 110 may be configured to supply control signals to input scheduler circuits IS1 to ISn, as well as output scheduler circuits $OS_1$ to $OS_n$ to thereby monitor and control the passage of data through optical switch 100. Control circuit 110 may implement a known scheduling algorithm, such as an iSLIP algorithm. In response to the outputs from control circuit 110, input scheduler circuits IS1 to ISn and/or output scheduler circuits OS1 to OSn may supply control signal to the optical gates (OG), as noted above.

In the example shown in FIGS. 1*a* and 1*b*, the scheduling of data transmission is centralized within control circuit 110. It is also contemplated, however, that circuitry may be included in IS1 to ISn, as well as OS1 to OSn, to monitor and the inflow and outflow of data through the switch, such that the scheduling can be considered to be distributed within optical switch 100. OS1 to OSn may also be configured to supply signals to optical gates OG to control the selective application of optical signals to each switching block, as described above.

The operation of an optical switch consistent with a further aspect of the present disclosure will next be described with reference to FIGS. 3*a* to 3*d*, which show a portion of an optical switch receiving n WDM signals, each having n channels. In addition, the example shown in FIGS. 3*a* to 3*d* includes: n splitters (PS1 to PSn), one AWG (AWG1), n optical gates associated with AWG1 (optical gates OG1 to OGn), and n photodiodes PD1 to PDn.

Figure 3A:
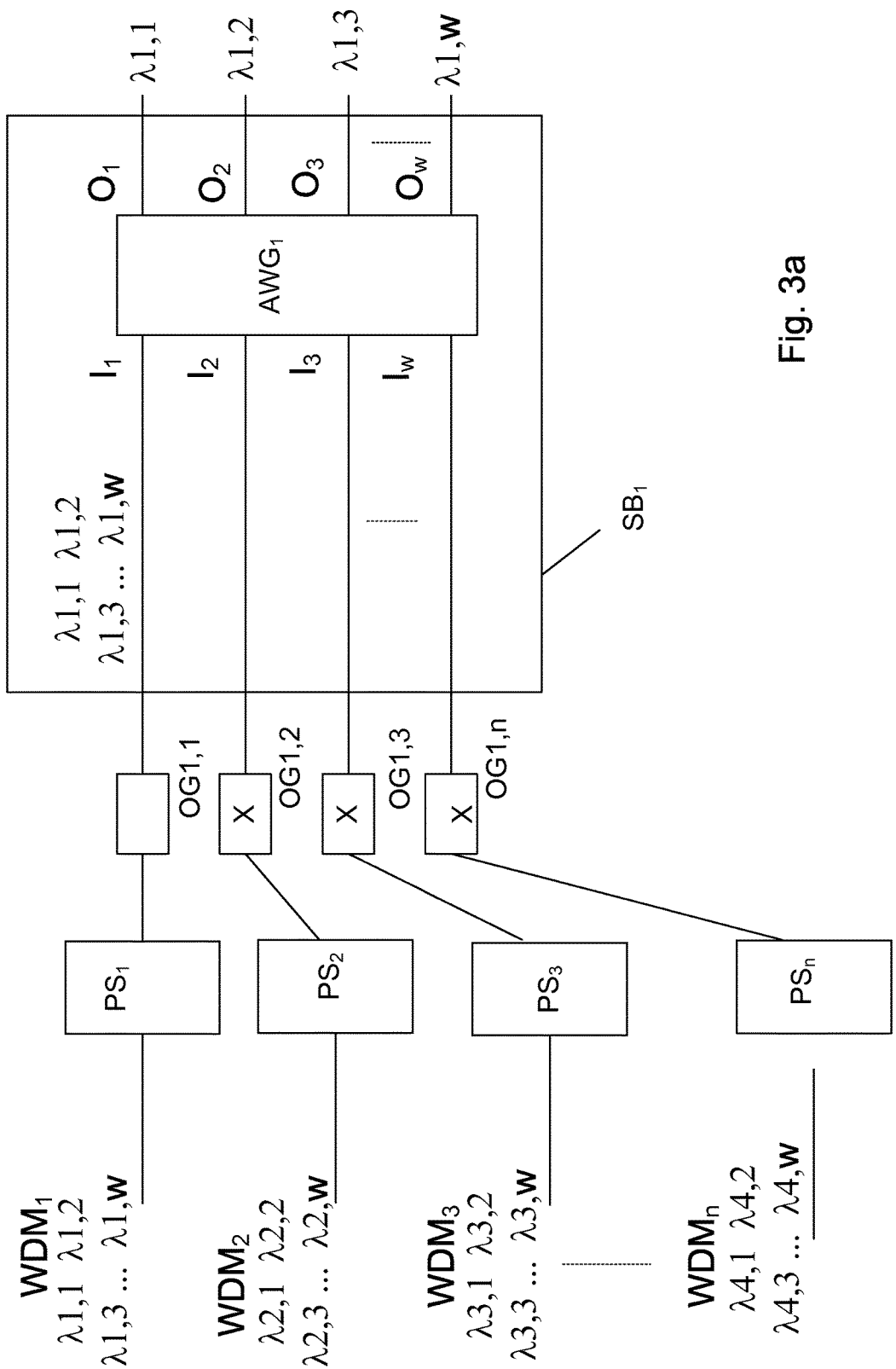
FIGS. 3a-3d illustrate examples of the operation of the optical switch shown in FIG. 1.

In particular, in FIG. 3*a*, a first WDM signal (WDM1) including w channels or optical signals, each of which having a corresponding one of wavelengths $\lambda_{1,1}$ $\lambda_{1,2}$ $\lambda_{1,3}$ to $\lambda_{1,w}$ is supplied to optical splitter PS1. For ease of explanation, the symbol "$\lambda$" will be used interchangeably to designate both an optical channel and a wavelength. Optical channels $\lambda_{1,1}$ $\lambda_{1,2}$ $\lambda_{1,3}$ to $\lambda_{1,w}$ are modulated to carry first information. A second WDM signal (WDM2), including optical channels $\lambda_{2,1}$ $\lambda_{2,2}$ $\lambda_{2,3}$ to $\lambda_{2,w}$ having the same wavelengths as channels $\lambda_{1,1}$ $\lambda_{1,2}$ $\lambda_{1,3}$ to $\lambda_{1,w}$, but modulated with different information, is supplied to optical splitter PS2. Additional WDM signals WDM3 to WDMn are supplied to splitters PS3 to PSn, respectively (WDM3 includes channels $\lambda_{3,1}$ $\lambda_{3,2}$ $\lambda_{3,1}$ to $\lambda_{3,w}$ and WDMn includes channels $\lambda_{n,1}$ $\lambda_{n,2}$ $\lambda_{n,3}$ to $\lambda_{n,w}$). Channels $\lambda_{1,1}$ $\lambda_{2,1}$ $\lambda_{3,1}$, $\lambda_{n,1}$, may have the same wavelength, $\lambda 1$; channels $\lambda_{1,2}$ $\lambda_{2,2}$ $\lambda_{3,2}$ to $\lambda_{n,2}$ may have the same wavelength, $\lambda 2$; channels $\lambda_{1,3}$ $\lambda_{2,3}$ $\lambda_{3,3}$ to $\lambda_{3,w}$ may have the same wavelength, $\lambda 3$; and channels $\lambda_{1,w}$ $\lambda_{2,w}$ $\lambda_{3,w}$ to $\lambda_{n,w}$ may have the same wavelength, $\lambda w$.

Splitter PS1 supplies a power split portion of signal WDM1 (including portions of channels $\lambda_{1,1}$ $\lambda_{1,2}$ $\lambda_{1,1}$ to $\lambda_{1,w}$) to optical gate $OG_{1,1}$, and splitter PS2 supplies a power split portion of signal WDM2 to optical gate $OG_{1,2}$. Similarly, splitters PS3 to PSn supply power split portions of signals WDM3 to WDMn to optical gates $OG_{1,3}$ to $OG_{1,n}$, respectively. Each of optical gates OG1 to OGn may include one of a Mach-Zehnder interferometer, semiconductor optical amplifier (SOA), variable optical attenuator (VOA), or an electro-absorption modulator. The optical gates $OG_{1,1}$ to $OG_{1,n}$ may be rendered either blocking or non-blocking to selectively pass the optical signals applied thereto. In the example shown in FIG. 3a, control circuit 110 (see FIG. 1a) supplies appropriate control signals to optical gate $OG_{1,1}$ so that it is rendered non-blocking during a first time interval, and therefore, passes a portion of each of optical channels $\lambda_{1,1}$ $\lambda_{1,2}$ $\lambda_{1,3}$ to $\lambda_{1,w}$ to AWG1. Further control signals output from control circuit 110 render optical gates $OG_{1,2}$ to $OG_{1,n}$ in a blocking state (as represented by the "X"s in FIG. 3a) so that portions of signals WDM2 to WDMn do not pass to AWG1.

Accordingly, a portion of WDM1 is input to AWG1 on input I1, and, as shown in FIG. 3a, each portion of optical channels $\lambda_{1,1}$ $\lambda_{1,2}$ $\lambda_{1,3}$ to $\lambda_{1,w}$ is supplied on a corresponding one of outputs O1 to On, which, in turn, directs these optical channels portions to corresponding photodiodes $PD_{1,1}$ to $PD_{1,w}$ (not shown in FIG. 3a). In one example, each output of $PD_{1,1}$ to $PD_{1,w}$ may be fed to ASIC1 (not shown in FIG. 3a), which, in turn, outputs corresponding electrical signals that carry the information of signal WDM1 during the first time interval.

Figure 3B:
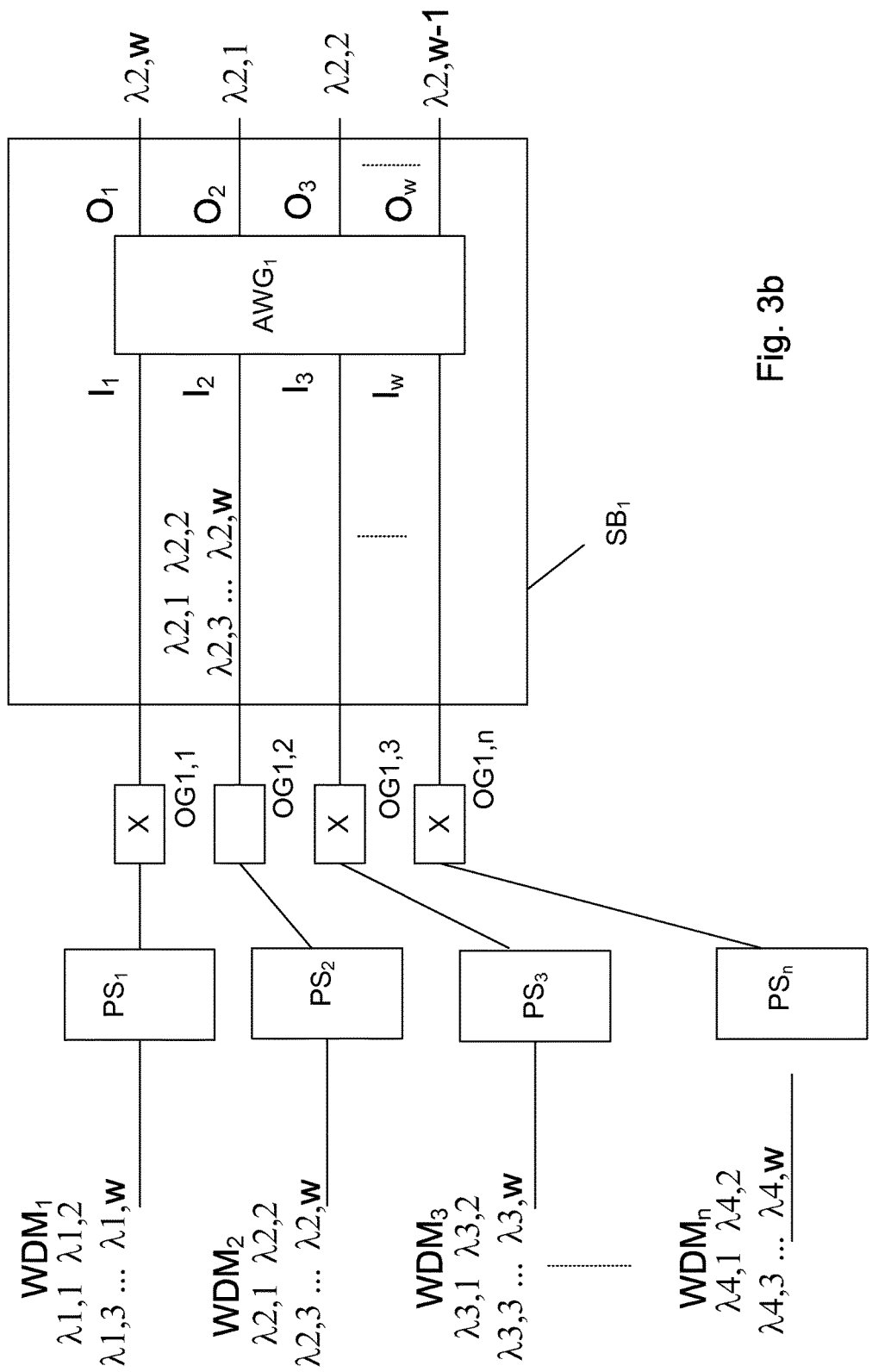

As shown in FIG. 3b, under the control of circuit 110 and during a second time interval, optical gates $OG_{1,1}$ and $OG_{1,3}$ to $OG_{1,n}$ are rendered blocking, while optical gate $OG_{1,2}$ is non-blocking. Accordingly, a portion of signal WDM2 (including portions of channels $\lambda_{2,1}$ $\lambda_{2,2}$ $\lambda_{2,3}$ to $\lambda_{2,w}$) is passed through optical gate $OG_{1,2}$ and supplied to input I2. Although optical channel portions $\lambda_{2,1}$ $\lambda_{2,2}$ $\lambda_{2,3}$ to $\lambda_{2,w}$ have the same wavelengths as optical channel portions $\lambda_{1,1}$ $\lambda_{1,2}$ $\lambda_{1,3}$ to $\lambda_{1,w}$, they are fed into a different input of AWG1 than optical channel portions $\lambda_{1,1}$ $\lambda_{1,2}$ $\lambda_{1,3}$ to $\lambda_{1,w}$. Accordingly, optical channel portions $\lambda_{2,n}$ and $\lambda_{2,1}$ are output on waveguides O1 and O2, respectively, and optical channel portions $\lambda_{2,2}$ to $\lambda_{2,w-1}$ are output on waveguides O3 to Ow, respectively. Each optical channel portion is fed to a corresponding one of photodiodes $PD_{1,1}$ to $PD_{1,w}$. In this example, electrical signals output from these photodiodes are supplied to output scheduler circuit $OS_1$ and then output as corresponding electrical signals carrying the information of signal WDM2 during the second time interval.

Figure 3C:
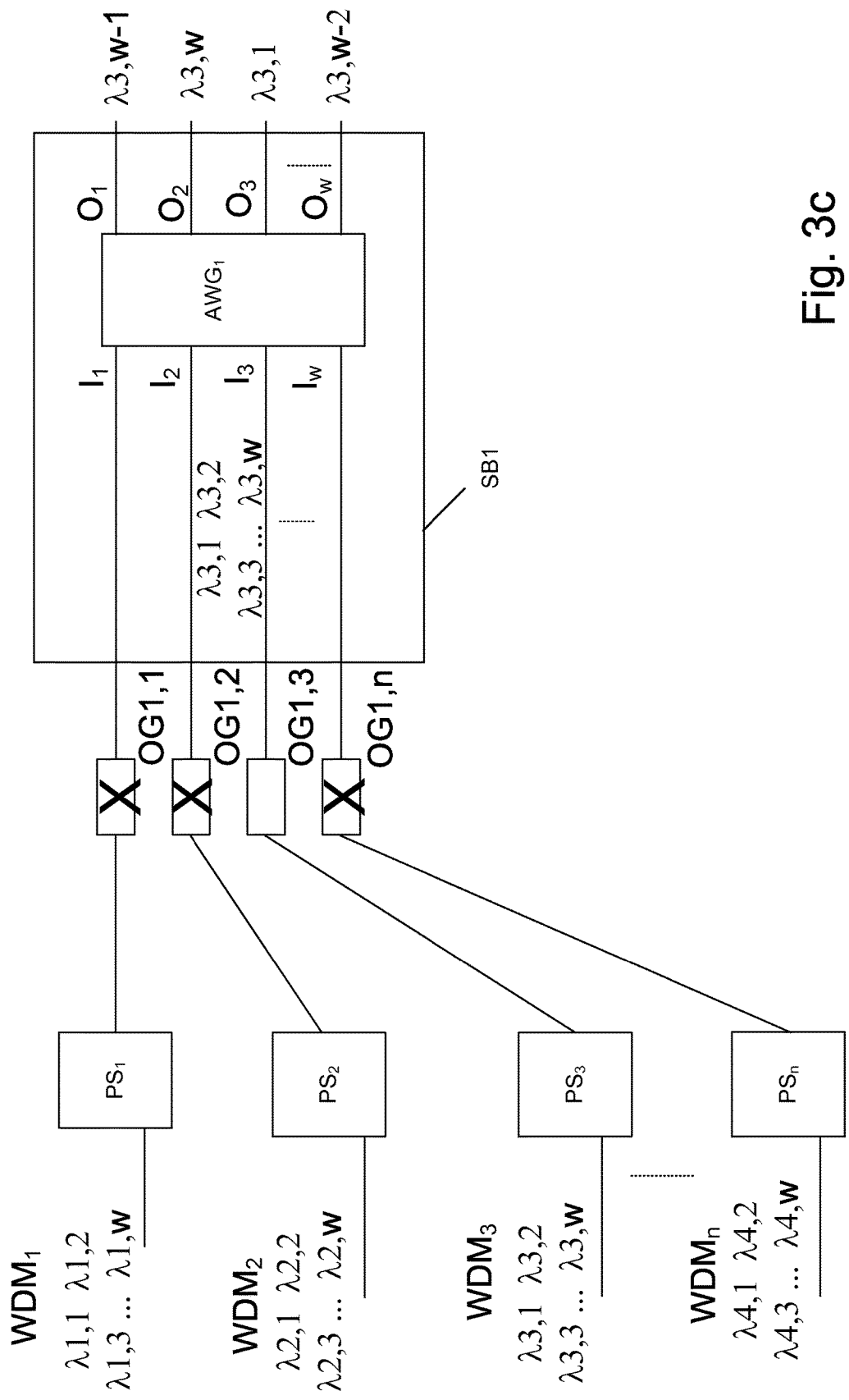
Figure 3D:
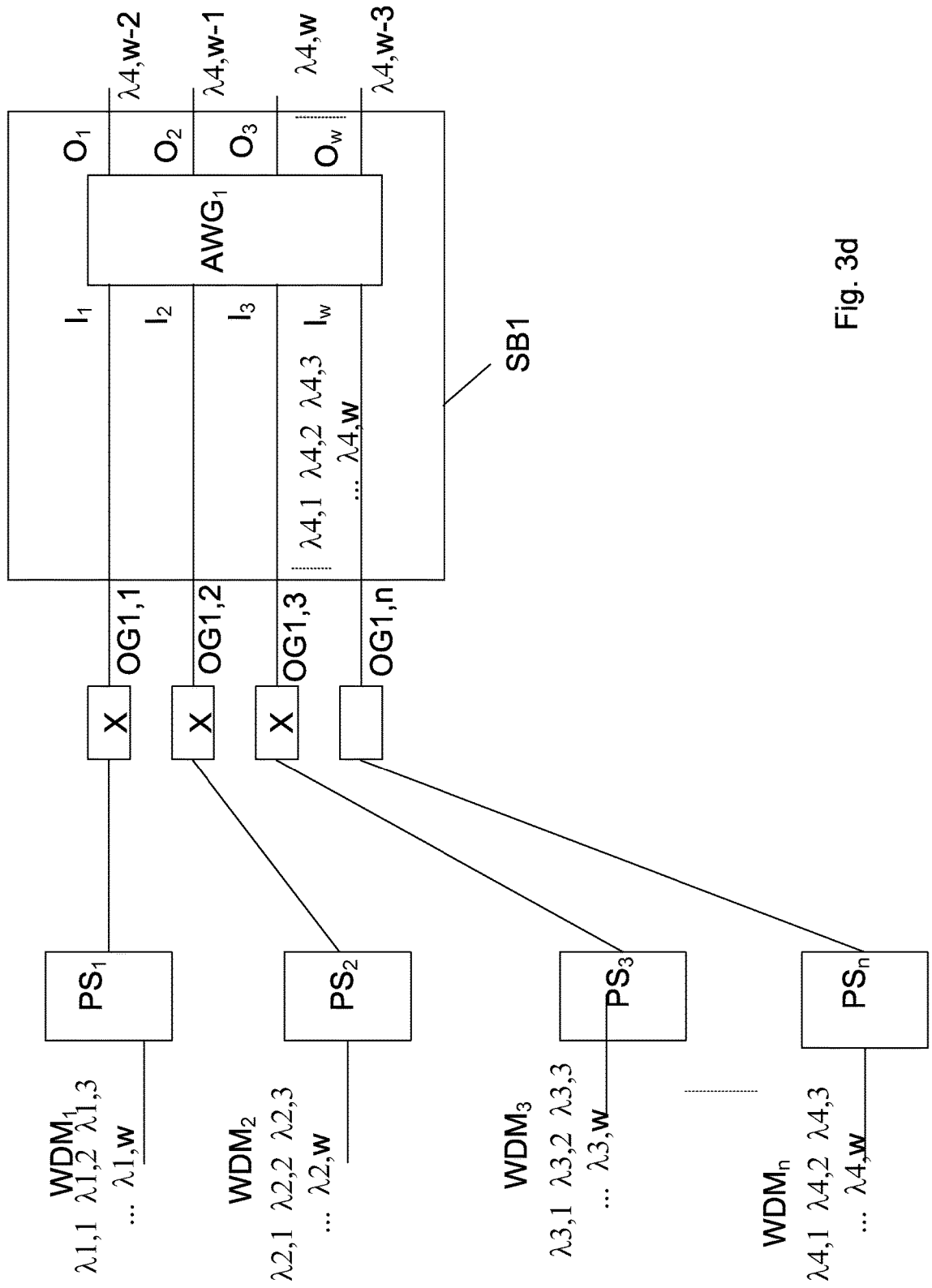

In FIG. 3c, optical gate OG3 is non-blocking during a third time interval, while remaining optical gates $OG_{1,1}$ $OG_{1,2}$ and $OG_{1,4}$ (not shown) to $OG_{n,1}$, are in a blocking state. Thus, $OG_{1,3}$ passes a portion of signal WDM3 (including portions of channels $\lambda_{3,1}$ $\lambda_{3,2}$ $\lambda_{3,1}$ to $\lambda_{3,w}$) to input waveguide I3 of AWG1. Channel portions $\lambda_{3,w-1}$ and $\lambda_{3,n}$ are output onto waveguides O1 and O2, respectively, and channels $\lambda_{3,1}$ to $\lambda_{3,w-2}$ are output onto a corresponding one of waveguides O3 to Ow. Further, in FIG. 3d, optical gate $OG_{1,n}$ is non-blocking during a fourth time interval, such that a portion of signal WDMn (including portions of channels $\lambda_{n,1}$ $\lambda_{n,2}$ $\lambda_{n,3}$ to $\lambda_{n,w}$) is transmitted to input In of AWG1, while the remaining WDM signal portions (WDM1, WDM2, WDM3 to WDMn-1 (not shown)) are blocked by gates $OG_{1,1}$, $OG_{1,2}$ and $OG_{1,3}$ to $OG_{1,w-1}$ (not shown), respectively. As a result, channels $\lambda_{n,w-2}$ and $\lambda_{n,w-1}$ are supplied to output waveguides O1 and O2 respectively, and channels $\lambda_{n,w}$ to $\lambda_{n,w-3}$ are supplied to outputs O3 to Ow, respectively.

Thus, by controlling optical gates OG1 to OGn in FIGS. 3a-3d, portions of signals WDM1 to WDMn are selectively supplied to and demultiplexed by AWG1. In a similar fashion, optical gates OG shown in FIG. 1b selectively apply portions of signals WDM1 to WDMn to arrayed waveguide gratings AWG1 to AWGn to thereby facilitate switching of any of signals WDM1 to WDMn to any of AWG1 to AWGn.

Figure 4A:
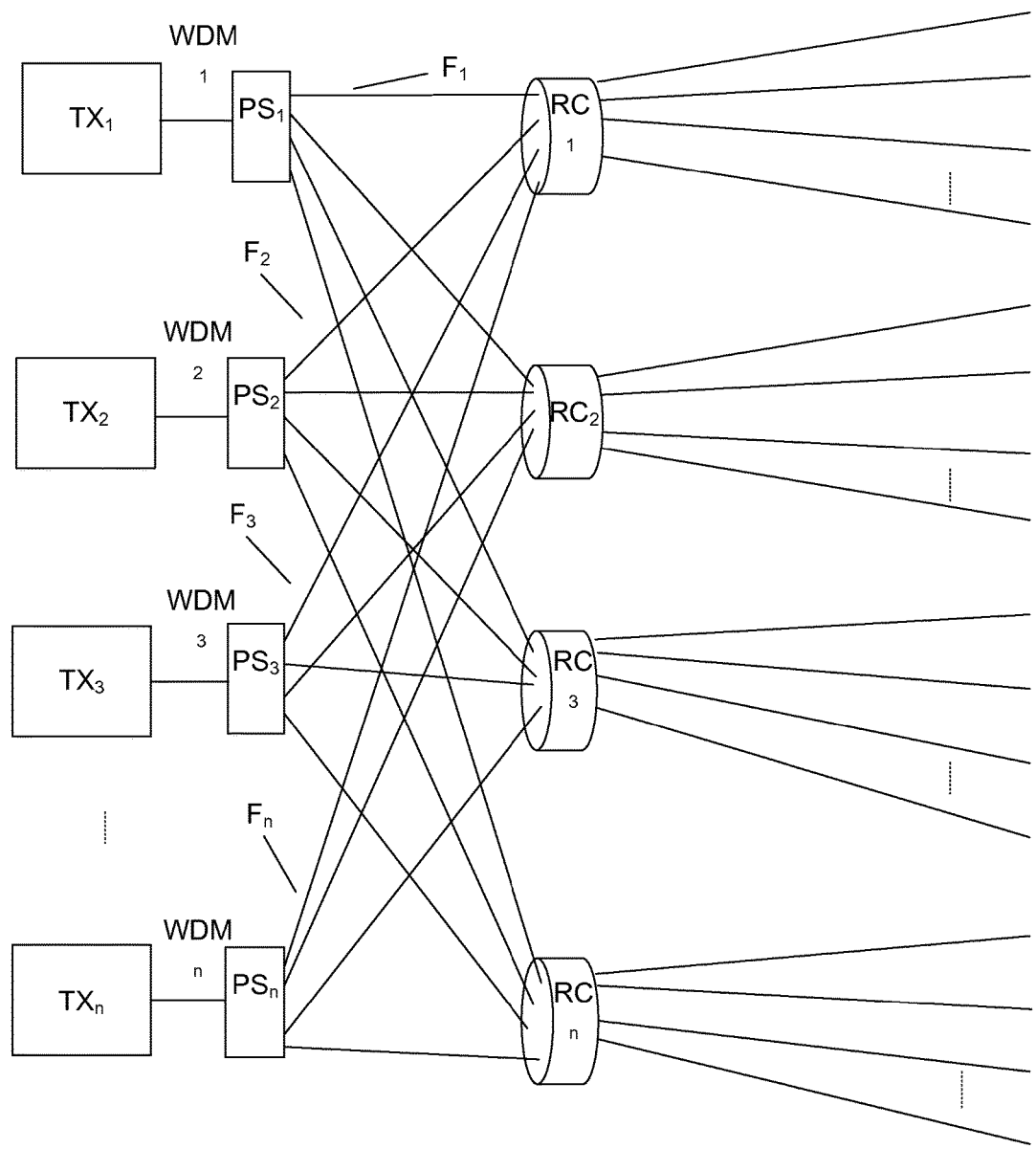
FIGS. 4a and 4b illustrate a further embodiment of an optical switch consistent with the present disclosure.
Figure 4A:
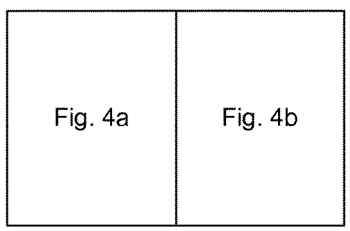
Figure 4B:
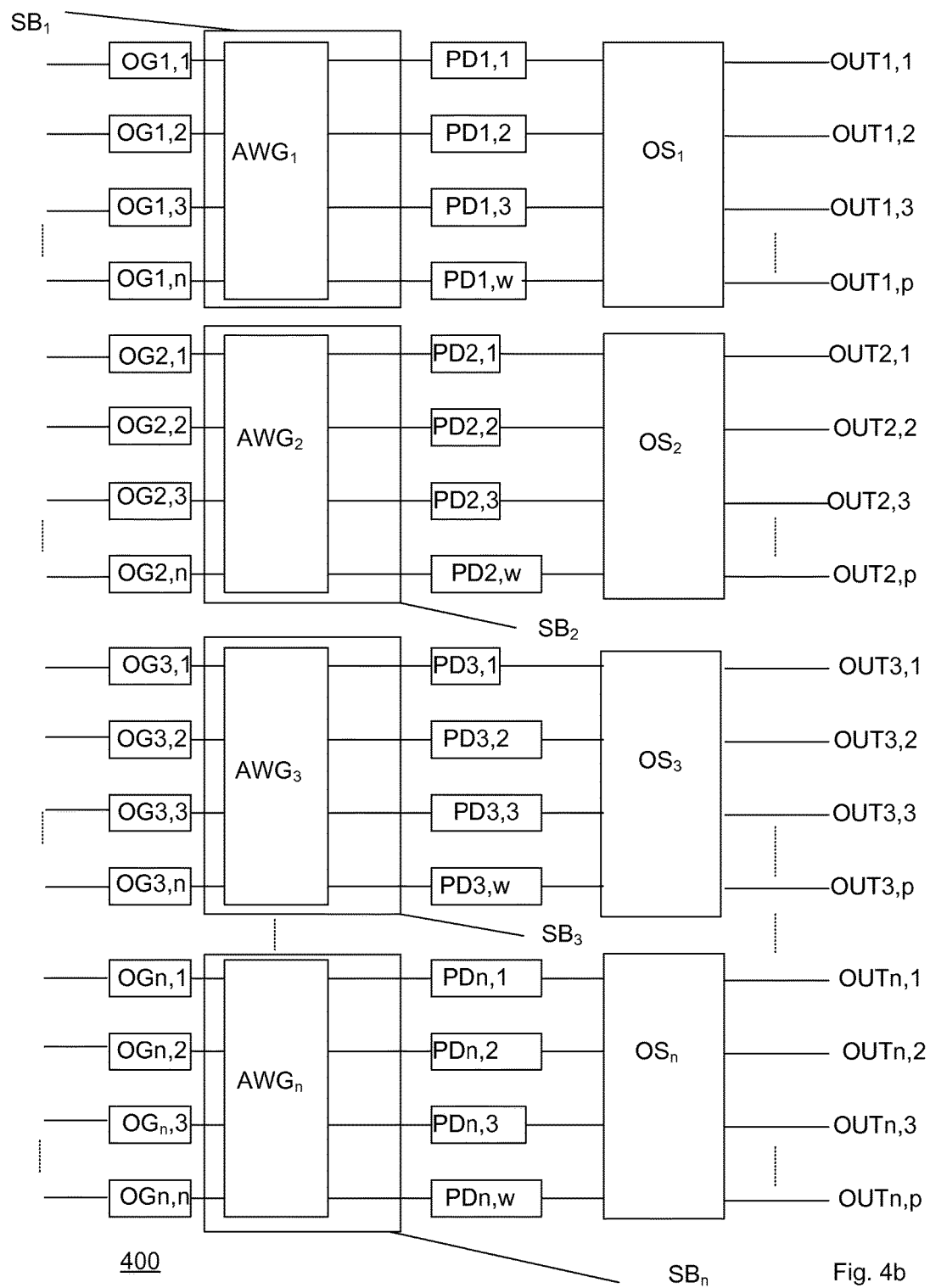

FIGS. 4a and 4b illustrate an optical switch 400 consistent with a further aspect of the present disclosure wherein optical fibers (provided in groups F1 to Fn) are provided in ribbon cables RC1 to RCn to direct the outputs of splitters PS1 to PSn to corresponding optical gates OG. Otherwise, optical switch 100 is similar in structure and operation to optical switch 100 discussed above in connection with FIG. 1a. For ease of illustration, circuits IS1 to ISn and control circuit 110 are omitted in FIGS. 4a and 4b.

Figure 5:
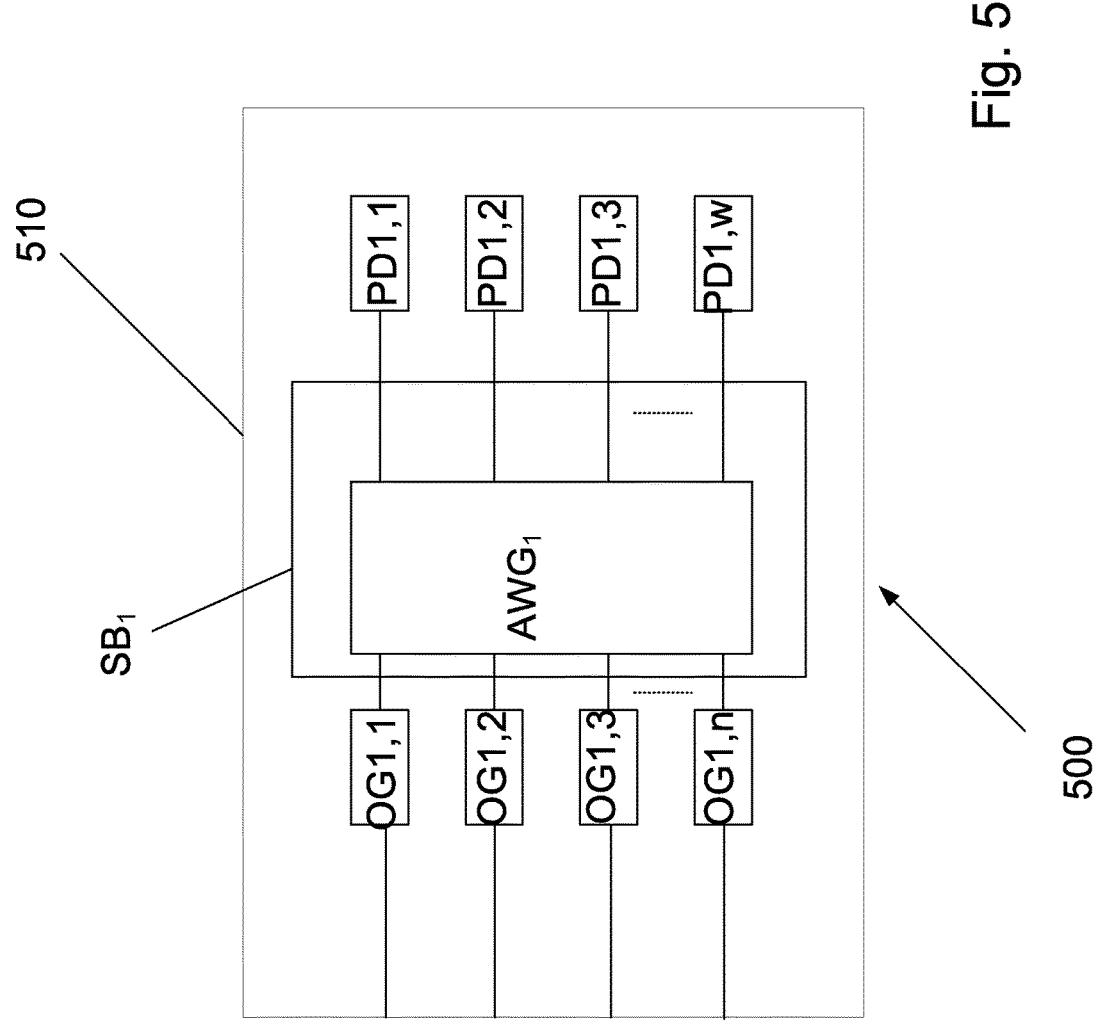
FIG. 5 illustrates a block diagram of a portion of an optical switch consistent with the present disclosure.

FIG. 5 shows an exemplary switch block SB1 in greater detail. Switch block SB1 may include a photonic integrated circuit (PIC) 500 including a substrate 510 having optical gates $OG_{1,1}$ to $OG_{n,n}$, and AWG1. Photodiodes $PD_{1,1}$ to $PD_{1,w}$ may also be provided on substrate 510. In addition, the photodiodes may be provided outside the switching block SB1 or inside it. Photonic integrated circuits having similar components are described in U.S. Pat. No. 7,116,851, the entire contents of which are incorporated herein by reference. It is noted that AWG2 to AWGn may be similarly integrated onto respective substrates, along with associated ones of optical gates $OG_{2,1}$ to $OG_{2,n}$, $OG_{3,1}$ to $OG_{3,n}$, . . . $OG_{n,1}$ to $OG_{n,n}$. Thus, a high capacity optical switch having a compact design may be obtained. Moreover, as noted above, an optical switch consistent with the present disclosure may be implemented with an optical switch stage, thereby realizing a simplified design.

Figure 6:
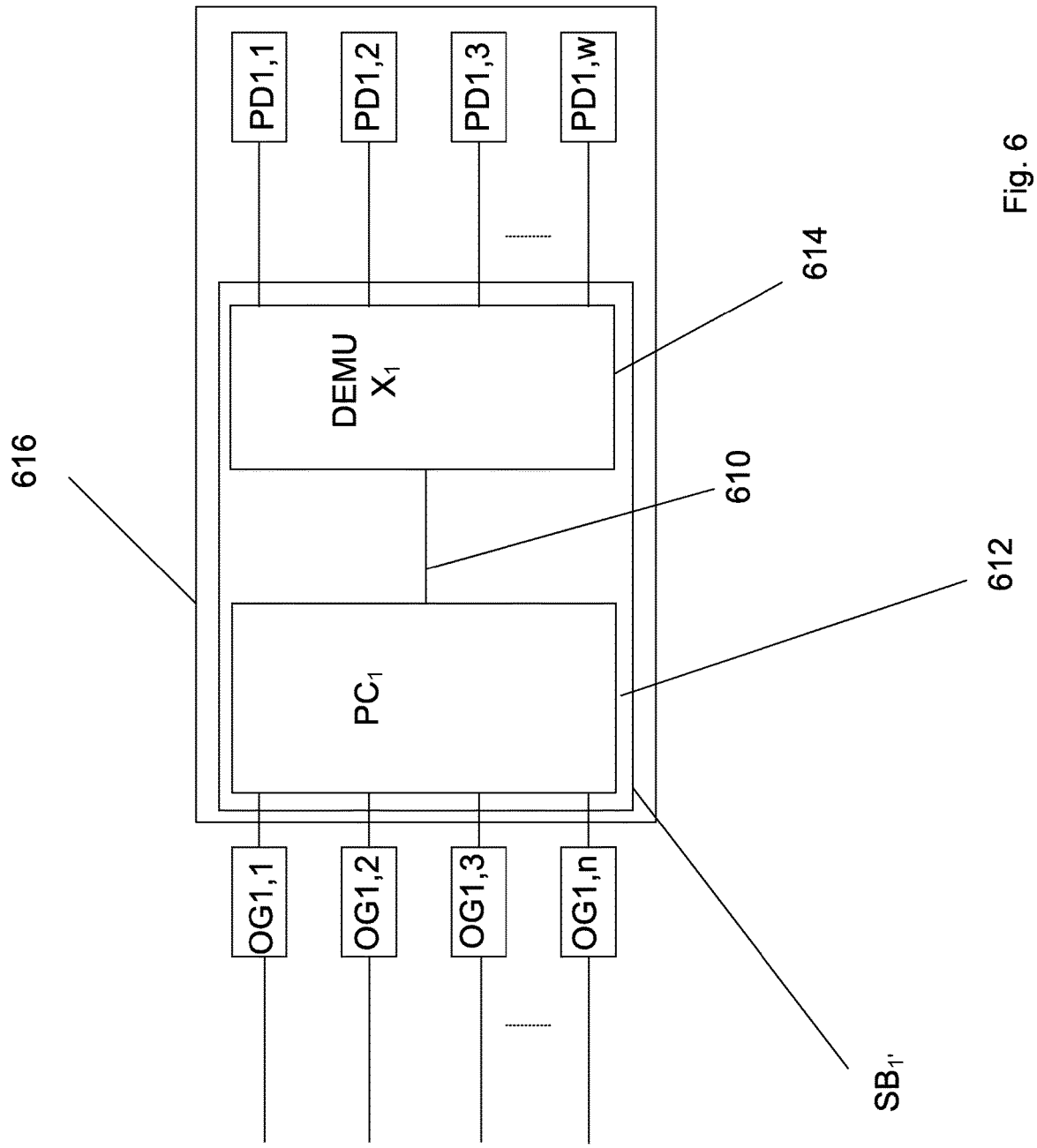
FIG. 6 illustrates a block diagram of a portion of an optical switch consistent with a further aspect of the present disclosure.

FIG. 6 illustrates an alternative switching block SB1'. SB1' differs from SB1 in that AWG1 is replaced with a combination of a power combiner 612 and demultiplexer 614 integrated, along with photodiodes $PD_{1,1}$ to $PD_{1,w}$, on a substrate 616 (photodiodes PD may optionally be provided off of substrate 616). In operation, light (e.g., a portion of one of the WDM signals noted above) supplied from one of optical gates $OG_{1,1}$ to $OG_{n,n}$ is supplied to power combiner 612, which supplies such light to an output 610. Output 610, in turn, feeds the light to a known demultiplexer 614, including, for example, an AWG, Echelle grating, thin film filter, interleaver, or Bragg grating, which separates the light into individual wavelengths or channels that are supplied to corresponding ones of photodiodes $PD_{1,1}$ to $PD_{1,w}$. In this example, if demultiplexer 614 includes an AWG, the AWG may have a single input coupled to output 610 of power combiner 612, instead of the multiple inputs associated with AWG1 discussed above. Moreover, semiconductor optical amplifiers (SOAs) may be used as optical gates $OG_{1,1}$ to $OG_{1,n}$ in the example shown in FIG. 6, in order to offset any optical power losses associated with power combiner 612.

If each switching block (SB) includes an AWG, the number of splitters (PS) will typically equal the number of AWGs (see FIG. 1b). On the other hand, if each switching block SB includes the power combiner/demultiplexer combination shown in FIG. 6, the number of splitters (PS) may be independent of the number of switching blocks SB.

An example of a crossbar switch 700 consistent with a further aspect of the present disclosure will next be described with reference to FIG. 7. Crossbar switch 700 is shown as having m inputs and n outputs (m×n. In the example shown in FIG. 7, crossbar switch 700 includes splitters PS1 to PSm which have an input that receives a corresponding one of WDM signals WDM1 to WDMm. Splitters PS1 to PSm have outputs that are coupled to individual optical gates (OG). For example, the outputs of splitter PS1 are connected to optical gates OG1,1; OG1,2; and OG1,n, respectively; the outputs of splitter PS2 are connected to optical gates OG2,1; OG2,2; and OG2,n, respectively; and the outputs of splitter PSm are connected to optical gates OGm,1; OGm,2; and OGm,n, respectively. Each of optical gates OG1,1 to OGm,n is coupled to one of optical combiners PC1 to PCn, as further shown in FIG. 7.

In operation, portions of the WDM signals WDM1 to WDMm output from splitters PS1 to PSm are fed to corresponding ones of the optical gates (OG), which are controlled to be either blocking or non-blocking by input or output scheduler circuits and/or a control circuit in a manner similar to that described above. Thus, for example, one of optical gates OG1,1 OG2,1,and OGm,1 may be rendered non-blocking to supply a portion of one of WDM signals WDM1 to WDMm to optical combiner PC1. Likewise, one of optical gates OG1,2 OG2,2,and OGm,2 may be rendered non-blocking to supply another portion of one of WDM signals WDM1 to WDM3 to optical combiner PC2; and one of optical gates OG1,n OG2,n,and OGm,n may be rendered non-blocking to supply another portion of one of WDM signals WDM1 to WDMm to optical combiner PCn. Thus, by appropriately controlling optical gates OG to be either blocking or non-blocking, a desired WDM signal portion may be output through one of combiners PC1 to PCn. Each of the outputs of combiners PC1 to PCn may be supplied to and demultiplexed by a corresponding one of demultiplexers DEMUX1 to DEMUXn, such as an AWG or other known demultiplexer discussed above. Photodetectors and other circuitry may be provided to further process the demultiplexed outputs from DEMUX 1 to DEMUXn. Demultiplexers DEMUX1 to DEMUXn may each be provided in corresponding photonic integrated circuits, as described, for example, in U.S. Pat. No. 7,457,496.

Figure 7:
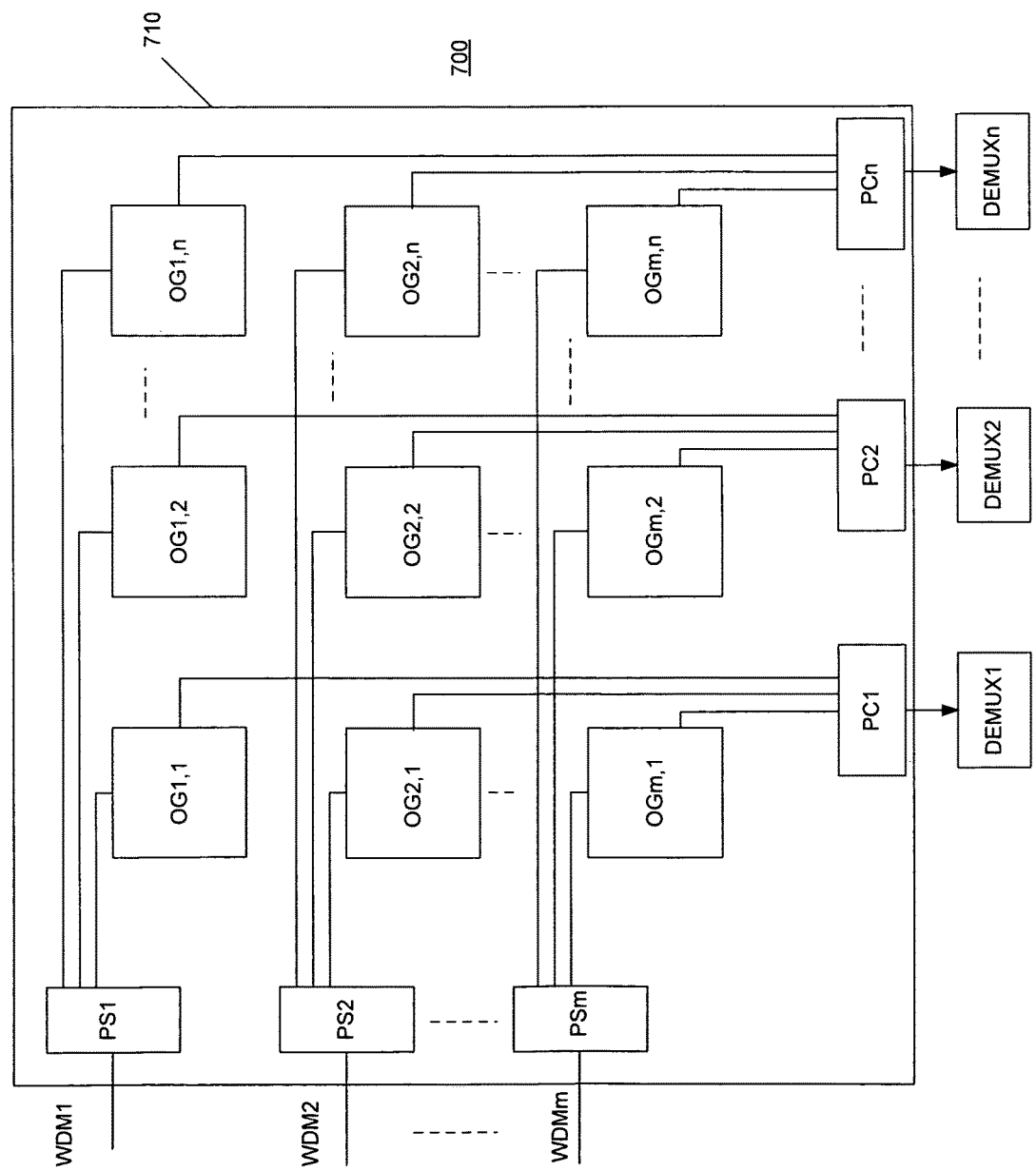
FIG. 7 illustrates a block diagram of a portion of an optical switch consistent with a further aspect of the present disclosure.

An advantage of the embodiment shown in FIG. 7 is that each of the splitters (PS), optical gates (OG) and combiners (PC) may be integrated onto a common substrate 710, so that a high capacity switch having a reduced size can be readily obtained.

In the above examples, optical switches 100, 400, 700 may switch optical signals having a non-return to zero (NRZ) format at a rate of, for example, 10 Gbits/sec Alternatively, the optical signals may be modulated in accordance with other modulation formats whereby the optical signals can each carry 100 Gbits/sec or more (e.g., polarization multiplexed differential quadrature phase shift keying (PM-DQPSK)).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus, comprising:
   a control circuit;
   a first input scheduler circuit including a first data queue and receiving first input data, the first input scheduler also receiving first control signals from the control circuit;
   a second input scheduler circuit including a second data queue and receiving second input data, the second input scheduler also receiving second control signals from the control circuit;
   first and second optical transmitters, each supplying first and second wavelength division multiplexed (WDM) signals, respectively;
   the first input scheduler circuit supplying data carrying inputs to the first transmitter, the second input scheduler circuit supplying data carrying inputs to the second transmitter;
   a first power splitter having an input that receives the first WDM signal and a second power splitter having an input that receives the second WDM signal;
   a first optical gate coupled to the first power splitter, such that the first optical gate receives a portion of the first WDM signal, and a second optical gate coupled to the second power splitter, such that the second optical gate receives a portion of the second WDM signal, the first and second optical gates selectively supplying one of a portion of the first WDM signal from the first optical gate or a portion of the second WDM signal from the second optical gate;
   an arrayed waveguide grating (AWG) having a first input, a second input, and a plurality of outputs, the first input is coupled to the first optical gate and receives the selectively supplied portion of the first WDM signal, and the second input is coupled to the second optical gate and receives the selectively supplied portion of the second WDM signal, the selectively supplied portion of the first WDM signal including a first plurality of optical signals, each of which having a corresponding one of a plurality of wavelengths, and the selectively supplied portion of the second WDM signal including a second plurality of optical signals, each of which having a corresponding one of the plurality of wavelengths, each of the plurality of outputs of the AWG supplying a corresponding one of either the first plurality of optical signals or the second one of the plurality of optical signals, such that one of the plurality outputs of the AWG supplies one of the first plurality of optical signals having a first wavelength of the plurality of wavelengths or said one of the plurality of outputs of the AWG supplies one of the second plurality of optical signals having a second wavelength of the plurality of wavelengths different than the first wavelength;
   a plurality of photodiodes, each of which receiving a respective one of either the first plurality of optical signals or the second plurality of optical signals, such that one of the plurality of photodiodes receives said one of the first plurality of optical signals having the first wavelength or the said one of the second plurality of optical signals having the second wavelength; and
   an output scheduler circuit that receives each of a plurality of outputs from a corresponding one of the plurality of photodiodes, the control circuit supplying third control signals to the output scheduler, such that in response to the first, second and third control signals, the first and second input scheduler circuits and the output scheduler circuit supply fourth control signals to the first and second optical gates to control said selectively supplying said one of the portion of the first WDM signal from the first optical gate or the portion of the second WDM signal from the second optical gate.

2. A switch in accordance with claim 1, wherein each of the plurality of optical gates includes a semiconductor optical amplifier.

3. A switch in accordance with claim 1, further including a substrate, the first optical gate, the second optical gate, and the arrayed waveguide grating being provided on the substrate.

4. A switch in accordance with claim 3, wherein the plurality of photodiodes are provided on the substrate.

5. A switch in accordance with claim 1, wherein the portion of the first WDM signal is a first portion of the first WDM signal and the portion of the second WDM signal is a first portion of the second WDM signal, the first power splitter has first and second outputs, the first output of the first power splitter supplying the first portion of the first WDM signal and the second output of the first power splitter supplying a second portion of the first WDM signal, the second power splitter has first and second outputs, the first output of the second power splitter supplying the first portion of the second WDM signal and the second output of the second power splitter supplying a second portion of the second WDM signal, the AWG being a first AWG, the switch further including:

third and fourth optical gates coupled to the second outputs of the first and second power splitters, respectively; and a second AWG having first and second inputs, the first input of the second AWG being coupled to the third optical gate and the second input of the second AWG being coupled to the fourth optical gate.

6. A switch in accordance with claim 1, further including:

a first ribbon cable including a first fiber that supplies the portion of the first WDM signal from first power splitter to the fist optical gate; and a second ribbon cable including a second fiber that supplies the second portion of the second WDM signal from the second power splitter to the second optical gate.

* * * * *